US007197989B2

(12) United States Patent
Apps

(10) Patent No.: US 7,197,989 B2
(45) Date of Patent: *Apr. 3, 2007

(54) METHOD OF REINFORCING A PLASTIC PALLET

(75) Inventor: William P. Apps, Alpharetta, GA (US)

(73) Assignee: Rehrig Pacific Company, Los Angeles, CA (US)

(*) Notice: Subject to any disclaimer, the term of this patent is extended or adjusted under 35 U.S.C. 154(b) by 476 days.

This patent is subject to a terminal disclaimer.

(21) Appl. No.: 10/150,916

(22) Filed: May 20, 2002

(65) Prior Publication Data

US 2002/0134284 A1 Sep. 26, 2002

Related U.S. Application Data

(63) Continuation of application No. 09/891,949, filed on Jun. 25, 2001, now Pat. No. 6,389,990, which is a continuation of application No. 09/108,532, filed on Jul. 1, 1998, now Pat. No. 6,250,234.

(51) Int. Cl.
B65D 19/00 (2006.01)

(52) U.S. Cl. .................................. 108/57.25

(58) Field of Classification Search ............. 108/57.25, 108/57.26, 57.27, 901, 902, 51.11
See application file for complete search history.

(56) References Cited

U.S. PATENT DOCUMENTS

| 1,910,781 | A | 5/1933 | Way |
| 2,544,657 | A | 3/1951 | Cushman |
| 2,699,912 | A | 1/1955 | Cushman |
| 2,828,933 | A | 4/1958 | De Pew et al. |
| 2,991,965 | A | 7/1961 | Drieborg |
| 3,126,843 | A | 3/1964 | De Laney |
| 3,152,693 | A | 10/1964 | Anderson |
| 3,187,689 | A | 6/1965 | Hess |
| 3,307,504 | A | 3/1967 | Cloyd et al. |
| 3,424,110 | A | 1/1969 | Toot |
| 3,467,032 | A | 9/1969 | Rowlands et al. |
| 3,481,285 | A | 12/1969 | Yellin |
| 3,580,190 | A | 5/1971 | Fowler |
| 3,602,157 | A | 8/1971 | Cohen et al. |
| 3,603,272 | A | 9/1971 | Ditges |
| 3,606,844 | A | 9/1971 | Lubker et al. |

(Continued)

FOREIGN PATENT DOCUMENTS

| DE | 2 232 200 | 1/1973 |
| DE | 26 13 083 | 10/1977 |
| DE | 27 33 457 | 2/1979 |
| DE | 3205910 A1 | 11/1983 |
| DE | 3205910 A1 | 11/1983 |

(Continued)

OTHER PUBLICATIONS

EPC Loudon Brochure "Plastic Pallets for the Beverage Industry" dated Apr. 1997.

Primary Examiner—Jose V. Chen

(57) ABSTRACT

A pallet assembly includes a top deck pallet portion and a bottom deck pallet portion which are mounted to each other and have a plurality of column portions extending therebetween. At least one of the top deck pallet portion and bottom deck pallet portion has a first surface with a plurality of cross-ribbed members projecting therefrom. The pallet assembly further includes at least one stiffening member securely mounted to the plurality of cross-ribbed members to define a plurality of box beam sections between the at least one stiffening member and the at least one of the top deck pallet portion and bottom deck pallet portion.

27 Claims, 6 Drawing Sheets

U.S. PATENT DOCUMENTS

| | | | |
|---|---|---|---|
| 3,613,605 A | 10/1971 | Holdredge, Jr. |
| 3,638,586 A | 2/1972 | Elshout |
| 3,640,229 A | 2/1972 | Bell |
| 3,651,769 A | 3/1972 | Foley |
| 3,654,874 A | 4/1972 | Skinner |
| 3,664,271 A | 5/1972 | Wolder et al. |
| 3,667,403 A | 6/1972 | Angelbeck, Jr. |
| 3,675,595 A | 7/1972 | Sullivan |
| 3,678,868 A | 7/1972 | Hirota |
| 3,680,495 A | 8/1972 | Pike |
| 3,680,496 A | 8/1972 | Westlake, Jr. |
| 3,683,821 A | 8/1972 | Mangold |
| 3,685,461 A | 8/1972 | Belcher |
| 3,699,901 A | 10/1972 | Cook, III |
| 3,699,902 A | 10/1972 | Allgeyer et al. |
| 3,710,733 A | 1/1973 | Story |
| 3,720,176 A | 3/1973 | Munroe |
| 3,759,194 A | 9/1973 | Fujii et al. |
| 3,795,206 A | 3/1974 | Utz |
| D231,096 S | 4/1974 | Adam |
| 3,814,031 A | 6/1974 | Fowler |
| D232,019 S | 7/1974 | Rehrig et al. |
| 3,824,933 A | 7/1974 | Lind |
| 3,835,792 A | 9/1974 | Wharton |
| 3,861,326 A | 1/1975 | Brown |
| 3,868,915 A | 3/1975 | Hafner |
| 3,878,796 A | 4/1975 | Morrison |
| 3,916,803 A | 11/1975 | Garcia |
| 3,917,066 A | 11/1975 | Cloyd |
| 3,938,448 A | 2/1976 | Nishitani et al. |
| 3,964,400 A | 6/1976 | Brand |
| 3,994,241 A | 11/1976 | Evans |
| 4,002,126 A | 1/1977 | Bell et al. |
| 4,013,021 A | 3/1977 | Steinlein et al. |
| 4,051,787 A | 10/1977 | Nishitani et al. |
| D246,296 S | 11/1977 | Fujii et al. |
| 4,103,857 A | 8/1978 | Levenhagen |
| 4,133,270 A | 1/1979 | Ravera |
| 4,146,205 A | 3/1979 | Skinner |
| 4,183,491 A | 1/1980 | Sanders et al. |
| 4,220,100 A | 9/1980 | Palomo et al. |
| 4,287,836 A | 9/1981 | Aoki |
| 4,316,419 A | 2/1982 | Cupido |
| 4,403,555 A | 9/1983 | Forrest |
| 4,597,338 A | 7/1986 | Kreeger |
| 4,606,278 A | 8/1986 | Shuert |
| RE32,344 E | 2/1987 | Wind |
| 4,735,154 A | 4/1988 | Hemery |
| 4,742,781 A | 5/1988 | Shuert |
| 4,799,433 A | 1/1989 | Luft |
| 4,843,976 A | 7/1989 | Pigott et al. |
| 4,869,456 A | 9/1989 | Jacobs |
| 4,951,821 A | 8/1990 | Kempkes |
| 4,972,782 A | 11/1990 | Shepherd et al. |
| 4,998,619 A | 3/1991 | Sowa et al. |
| 5,042,396 A | 8/1991 | Shuert |
| 5,046,434 A | 9/1991 | Breezer et al. |
| 5,097,951 A | 3/1992 | Pigott et al. |
| 5,117,762 A | 6/1992 | Shuert |
| 5,154,286 A | 10/1992 | Gits |
| 5,160,029 A | 11/1992 | Pigott et al. |
| 5,197,395 A | 3/1993 | Pigott et al. |
| 5,205,221 A | 4/1993 | Melin et al. |
| D346,681 S | 5/1994 | Pigott et al. |
| D347,511 S | 5/1994 | Pigott et al. |
| 5,337,681 A | 8/1994 | Schrage |
| 5,343,814 A | 9/1994 | Pigott et al. |
| D354,606 S | 1/1995 | Pigott et al. |
| 5,391,251 A | 2/1995 | Shuert |
| 5,401,347 A | 3/1995 | Shuert |
| 5,404,829 A | 4/1995 | Shuert |
| 5,413,052 A | 5/1995 | Breezer et al. |
| D364,030 S | 11/1995 | Pigott et al. |
| 5,470,641 A | 11/1995 | Shuert |
| 5,520,121 A | 5/1996 | Schubart et al. |
| D370,763 S | 6/1996 | Pigott et al. |
| D371,882 S | 7/1996 | Kristoffersson |
| D372,192 S | 7/1996 | Pigott et al. |
| 5,549,056 A | 8/1996 | Jordan et al. |
| 5,555,820 A | 9/1996 | Shuert |
| 5,566,624 A | 10/1996 | Brown et al. |
| 5,579,686 A | 12/1996 | Pigott et al. |
| D378,458 S | 3/1997 | Pigott et al. |
| 5,638,760 A | 6/1997 | Jordan et al. |
| 5,666,886 A | 9/1997 | Alexander et al. |
| 5,676,064 A | 10/1997 | Shuert |
| 5,736,221 A | 4/1998 | Hardigg et al. |
| 5,755,162 A | 5/1998 | Knight et al. |
| 5,778,801 A | 7/1998 | Delacour |
| D398,731 S | 9/1998 | Pigott et al. |
| D398,732 S | 9/1998 | Pigott et al. |
| 5,806,436 A | 9/1998 | Weichenrieder, Sr. et al. |
| 5,836,255 A | 11/1998 | Uitz |
| 5,845,588 A | 12/1998 | Gronnevik |
| 5,868,080 A | 2/1999 | Wyler et al. |
| 5,894,803 A * | 4/1999 | Kuga ..................... 108/51.11 |
| 5,950,546 A | 9/1999 | Brown et al. |
| 5,967,057 A | 10/1999 | Nakayama et al. |
| 6,125,770 A | 10/2000 | Brandenburg |
| 6,199,488 B1 | 3/2001 | Favaron et al. |
| 6,250,234 B1 * | 6/2001 | Apps ..................... 108/57.25 |
| 6,283,044 B1 * | 9/2001 | Apps ..................... 108/57.25 |
| 6,354,230 B1 | 3/2002 | Maschio |
| 6,357,366 B1 | 3/2002 | Frankenberg |
| 6,389,990 B1 | 5/2002 | Apps |
| 6,446,563 B1 * | 9/2002 | Ohanesian ............... 108/57.25 |

FOREIGN PATENT DOCUMENTS

| | | |
|---|---|---|
| DE | 38 06 097 | 9/1989 |
| DE | 196 51 999 | 6/1998 |
| EP | 166485 | 7/1921 |
| EP | 1310898 | 3/1973 |
| EP | 0 226 505 | 6/1986 |
| EP | 0202203 | 11/1986 |
| EP | 0301445 | 2/1989 |
| EP | 0 754 540 A | 1/1997 |
| EP | 0 849 184 A1 | 5/1998 |
| FR | 2 274 512 | 8/1974 |
| FR | 2 259 023 | 1/1975 |
| FR | 2 486 029 | 7/1980 |
| FR | 2 715 127 A1 | 7/1995 |
| HU | 9303243 | 3/1994 |
| HU | 9900326 | 5/1999 |
| JP | 53 058581 | 5/1978 |
| JP | 06-179448 | 6/1994 |
| JP | 09 202327 | 8/1997 |
| RU | 701 869 | 12/1979 |
| WO | WO 90/01448 | 2/1990 |
| WO | WO 94/08861 | 10/1992 |
| WO | WO 94 10051 | 5/1994 |
| WO | WO 94 11262 A1 | 5/1994 |
| WO | WO 97/09239 | 3/1997 |

* cited by examiner

METHOD OF REINFORCING A PLASTIC PALLET

CROSS-REFERENCE TO RELATED APPLICATION

This application is a continuation of U.S. application Ser. No. 09/891,949 filed Jun. 25, 2001, now U.S. Pat. No. 6,389,990 which is a continuation of U.S. application Ser. No. 09/108,532 filed Jul. 1, 1998 now U.S. Pat. No. 6,250,234.

TECHNICAL FIELD

The present invention relates to a method of reinforcing a plastic pallet, and more particularly to a method of reinforcing a plastic pallet by applying a plurality of sheet strips along relatively weak structural portions of the pallet to form a plurality of substantially rectangular hollow vertical cross-sections along the length of the relatively weak structural portions for improved stiffness.

BACKGROUND ART

Replacing wood pallets with plastic pallets has been a goal for many years. The advantages of the plastic pallets are many as compared to wood, including greater durability, lighter weight, more consistent dimensions, improved cleanliness, water resistance, higher residual value for recycling, and no nails which may damage products being supported thereon.

One major hurdle to overcome with plastic is the cost. Plastic pallets are more expensive than wood by three to five times. This cost can be offset by the number of trips or shipments that can be achieved with plastic versus wood pallets. Another major hurdle is the stiffness of plastic pallets. Racking loaded pallets in warehouses for up to 30 days is common, and the combination of low tensile strength and creep limit the use of plastic.

There are three conventional methods of overcoming these weaknesses. The first is to add reinforcement such as steel or a composite to the pallet. This generally adds significant cost and weight and complicates recycling of the pallet. The second is to make the pallet taller. This limits the height of product to be stacked on the pallet. The third is to use reinforced or engineered resins. Again, this adds significant cost and weight. All three obviously limit the acceptance of plastic pallets.

U.S. Pat. No. 3,580,190 provides a partial solution to the stiffness problem by attaching top and bottom sheets 22,24 to the structural network 23, as shown in FIG. 1 thereof. However, this solution does not resolve the bending stiffness problem because large lateral and longitudinal unsupported areas still exist, such as in areas 26, 37, 38, 49 and 50. In other words, this design merely further stiffens the support column areas 67, 68, 69, 97, 98, 99, 28, 30, 32, which already provide substantial stiffness merely as a result of their height. The weakness of this design is apparent in column 6, lines 60–71, where Fowler recommends the use of a material having a flexural modulus (or Young's modulus) greater than about 200,000 psi. Such a high modulus material is apparently required because the structure described does not provide significant resistance to deflection along the length and width of the pallet. High modulus materials add substantial cost to the pallet.

Further complicating the problem, modern pallets typically require large openings for receipt of pallet jacks. For example, the pallet shown in FIGS. 1–3 includes a top deck portion 16 supported on a plurality of support columns 18, which are attached to support rails 20, which form the bottom deck 19. Such structure cooperates to form two large openings 11,13 on each side of the pallet 10, as well as four bottom openings 15 formed in the lower deck 19. In this configuration, the rails 20 of the lower deck 19 are typically structurally weak, resulting in poor deflection stiffness. Such problems have proven very difficult to overcome because of the very thin nature of the lower deck 19. Similarly, the thin design of the top deck 16 results in the same deflection problem between columns 18.

Because pallets are exposed to significant abuse, any solution to the stiffness problem must not adversely effect the impact strength of the pallet.

Accordingly, a need exists for improving the stiffness of modern plastic pallets configured to receive a pallet jack, without reducing impact strength of the pallet.

SUMMARY OF THE INVENTION

The present invention provides a method of reinforcing a modern plastic pallet by affixing sheet strips along relatively weak structural portions of the pallet to form a plurality of substantially rectangular hollow vertical cross-sections along the length of the relatively weak structural portions for improved stiffness without loss of impact strength.

More specifically, the present invention provides a method of reinforcing a plastic pallet having a thin top deck portion, a plurality of support columns extending from the top deck portion and a plurality of support rails connected to the support columns to form a thin bottom deck portion, wherein the support rails each include a sheet portion with a plurality of vertical ribs extending therefrom. The method includes the step of welding a plurality of plastic sheets to the vertical ribs between the support columns to form a plurality of substantially rectangular hollow vertical cross-sections along the length of the support rails for improved stiffness. It is contemplated that the substantially rectangular hollow vertical cross-sectional areas may be filled with a secondary material, such as structural foam for improved structural integrity.

Accordingly, an object of the present invention is to provide a method of structurally reinforcing a modern plastic pallet configured to receive a pallet jack, in a manner which improves stiffness without loss of impact strength.

The above object and other objects, features and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
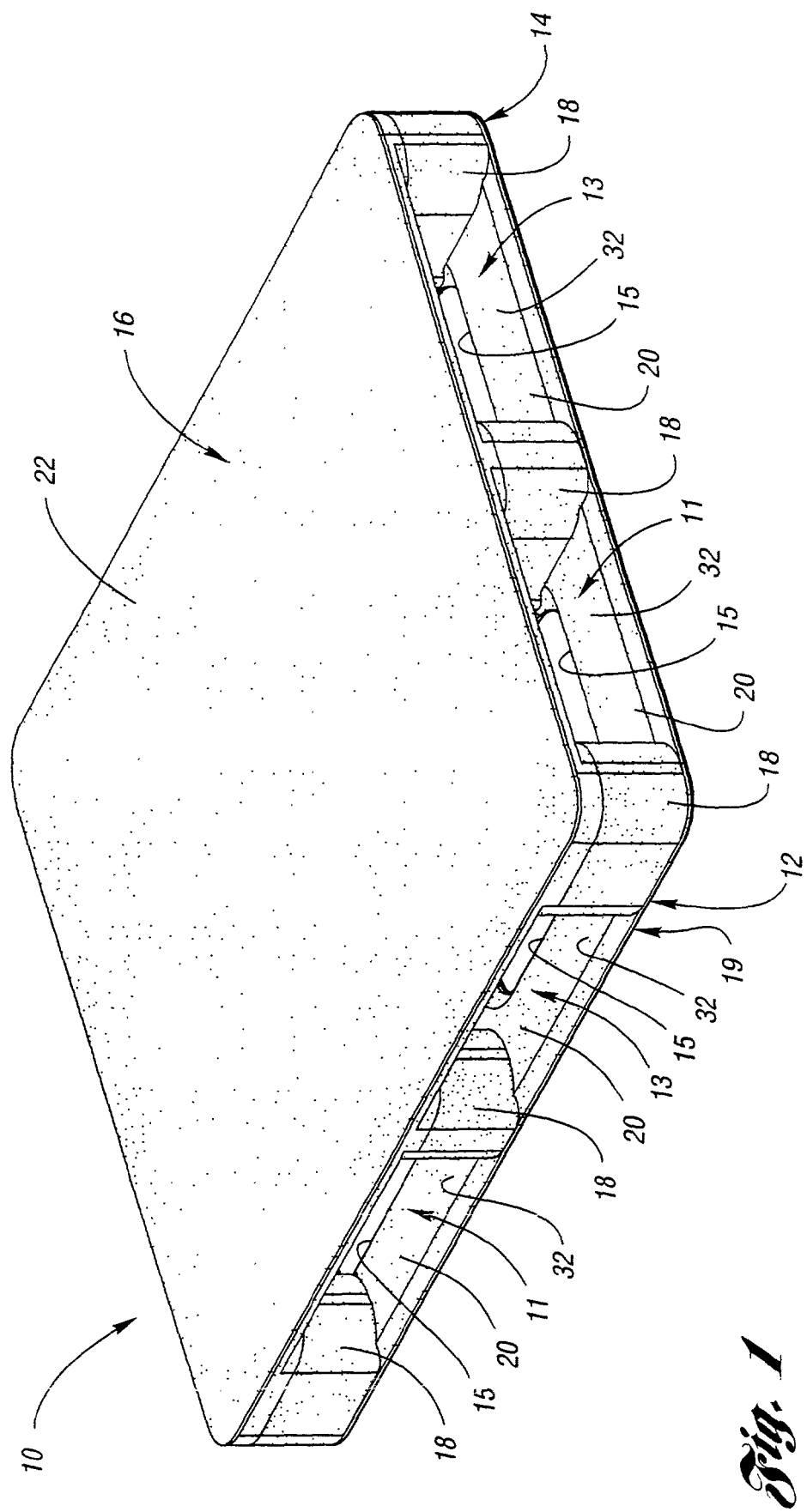
FIG. 1 shows a perspective view of a modern plastic pallet in accordance with the present invention.

In a racking scenario, the modern plastic pallet 10 (which is configured to receive a pallet jack from any side), shown in FIG. 1, is supported from below on two opposing edges 12,14, and loaded on the top deck portion 16. The pallet must support this load with a minimum of deflection. The top deck portion 16 is supported by a plurality of support columns 18 extending from the top deck portion 16 and attached to the support rails 20, which form the bottom deck 19. The support rails 20 are generally relatively weak structural portions of the pallet because they are thin in vertical cross-section and are supported only at opposing ends by the columns 18. Accordingly, the support rails 20 tend to deflect when the pallet is loaded.

Using simple beam formulas it is known that the deflection increases as the load or the span distance increases and decreases as the material modulus (E) or section moment of inertia (I) increases. Since the load and the span are defined for a given application, the variables used to minimize deflection are the material and the section design.

A good rule of thumb with plastics is that as the E value increases for a given material, the impact strength decreases. There are engineered materials that can solve these problems but they are too expensive for wide spread use. The most common method is to use a commodity resin such as polyethylene or polypropylene and add a filler to stiffen the resin. Fillers add weight and reduce impact strength for a given material as well as impact the recyclability in some cases. They also add cost, which can be the biggest problem to overcome. So, the ideal pallet would use a commodity resin because of cost, weight, and impact strength. Accordingly, optimizing the design of the pallet is the preferred method to achieve improved pallet performance.

As mentioned above, deflection decreases as the section moment of inertia (I) increases. For a pallet, the easiest method to increase stiffness is to increase height. However, in practice there is a maximum allowable height for pallets, and existing pallets are generally designed at this maximum value. Accordingly, the only alternative is to maximize the moment of inertia for each pallet component, namely the top deck 16 and bottom deck support rails 20.

For a given section geometry, the highest I value is for a solid section. For instance, the stiffest top deck design is one that is a solid plastic. Obviously, this is impractical because of weight and cost. Most designs attempt to overcome this by using ribbed sections instead of solid sections to minimize the loss of I and reduce the weight to an acceptable level. Another method is to use foaming agents along with the ribs to minimize the weight of the ribs and improve the I value. Both methods have a limit to their effectiveness. Namely, ribs are not the ideal geometry to maximize the I value, and while foaming improves this slightly, it also reduces the impact strength of the material.

It is known that for a given section the material closest to the neutral axis has the least effect on the I value, and the material farthest away has the greatest effect. In other words, a hollow or I-beam section is stiffer than a rectangular section of equal height and area. Therefore, the object of the design is to create hollow or boxed sections everywhere possible. Conventional injection molding techniques make this almost impossible to create, but by using a simple secondary operation, we are able to make a boxed top deck 16 and bottom deck 19.

Figure 2:
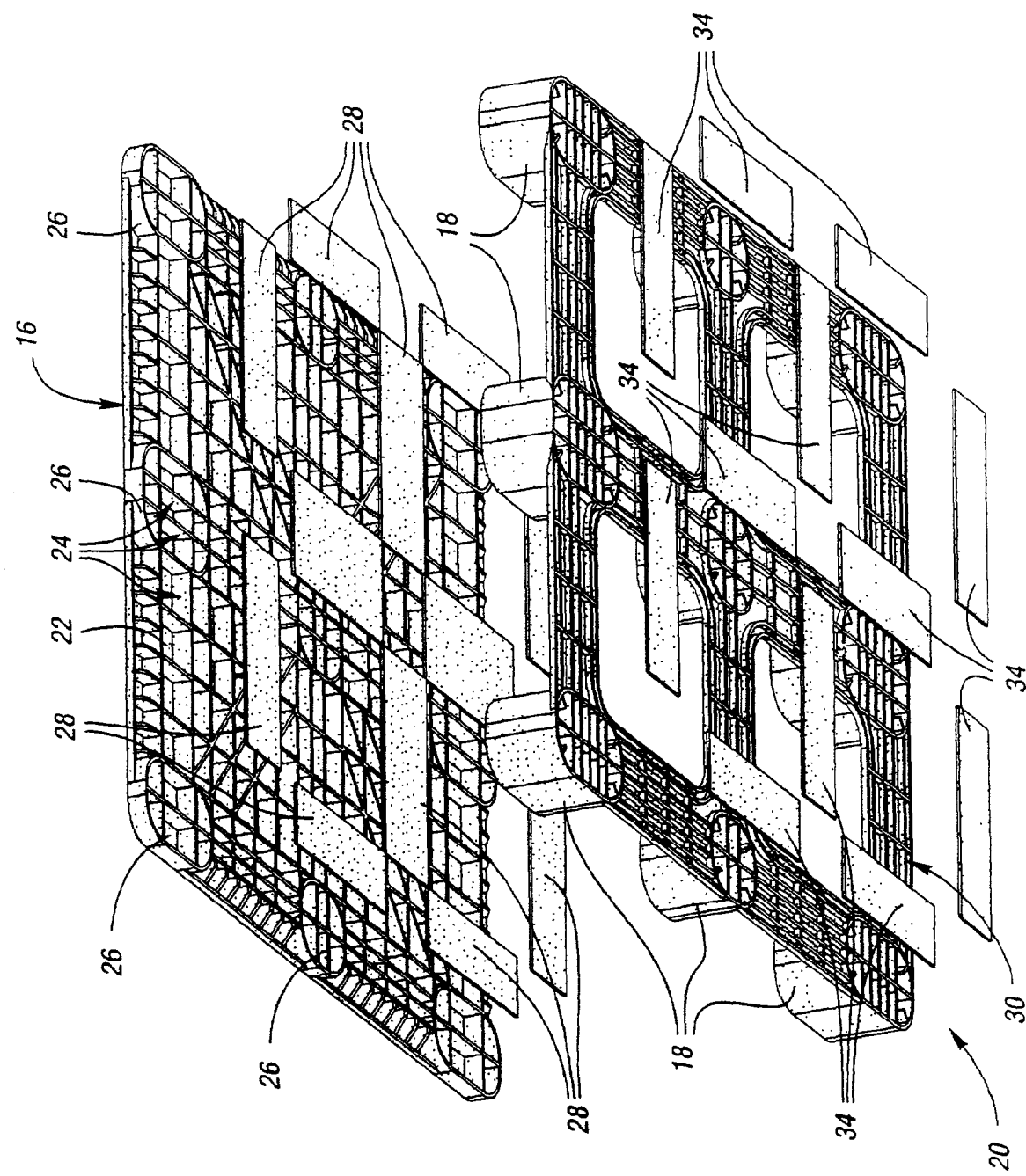
FIG. 2 shows a bottom exploded perspective view of the pallet of FIG. 1.

A pallet in accordance with the present invention includes the top deck portion 16, which is injection molded conventionally and consists of a flat upper surface 22 with a series of ribs 24 protruding from the upper surface 22 as shown in FIG. 2. The top deck portion 16 includes a plurality of pockets 26 for receiving the support columns 18. A plurality of plastic sheet strips 28 are sonically welded to the ribs 24 to form a plurality of substantially rectangular hollow boxed sections between the pockets 26 within the top deck 16 (as described later with reference to FIG. 4). Alternatively, other attachment methods such as vibratory welding, hot plate welding, adhesive etc. may be used for attachment of the plastic sheet strips 28.

The bottom deck 19 is constructed similarly but has the support columns 18 integrally molded therewith. Ribs 30 protrude downwardly from the sheet portions 32 of the support rails 20, and a plurality of plastic sheet strips 34 are welded to the ends of the ribs 30 to form a plurality of boxed cross-sections along the length of the rails 20 between the columns 18. The top and bottom decks 16,19 may be joined permanently by welding, or can be snapped together as commonly known in the art.

The method described above is preferably used to stiffen conventional ribbed pallet designs. The small sheets of plastic 34 are welded into critical deflection areas of the existing pallets for stiffening. Also, new pallets could be designed to accept the sheets for applications that require racking, and would eliminate the sheets for lighter, lower cost applications. For example, the ribs 30 may be recessed in order to receive the sheets 34 in a position flush with the bottom surface of the support rails 20.

The method described above is particularly applicable for use in pallets such as that shown in FIG. 1 which has a very thin top deck 16 and bottom deck 19 to allow four-way entry of pallet jacks. The method described may be used to maximize the moment of inertia of each deck member.

Figure 4:
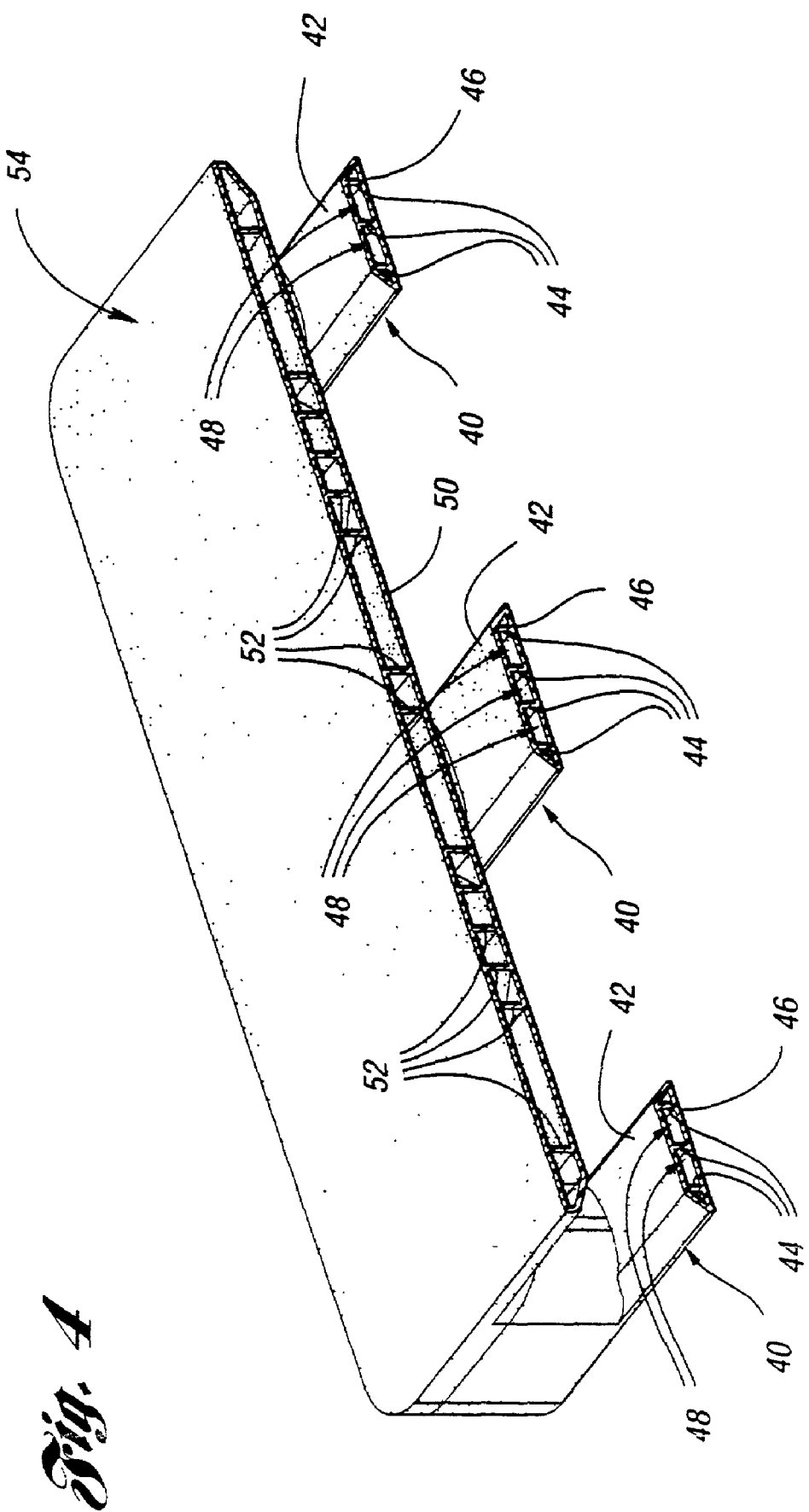
FIG. 4 shows a cut-away perspective sectional view of a pallet in accordance with an alternative embodiment of the invention.

Referring to FIG. 4, an alternative embodiment of the invention is shown. Similar to the embodiment shown in FIG. 1, the bottom deck rails 40 include a sheet portion 42 with a plurality of vertical ribs 44 extending therefrom. The plastic sheet strips 46 are welded to the ribs 44 to form the plurality of substantially rectangular hollow vertical cross-sections 48 along the length of the support rails 40. Of course, numerous ribs 44 could be added to create numerous rectangular cross-sections for further improved structural integrity.

Figure 3:
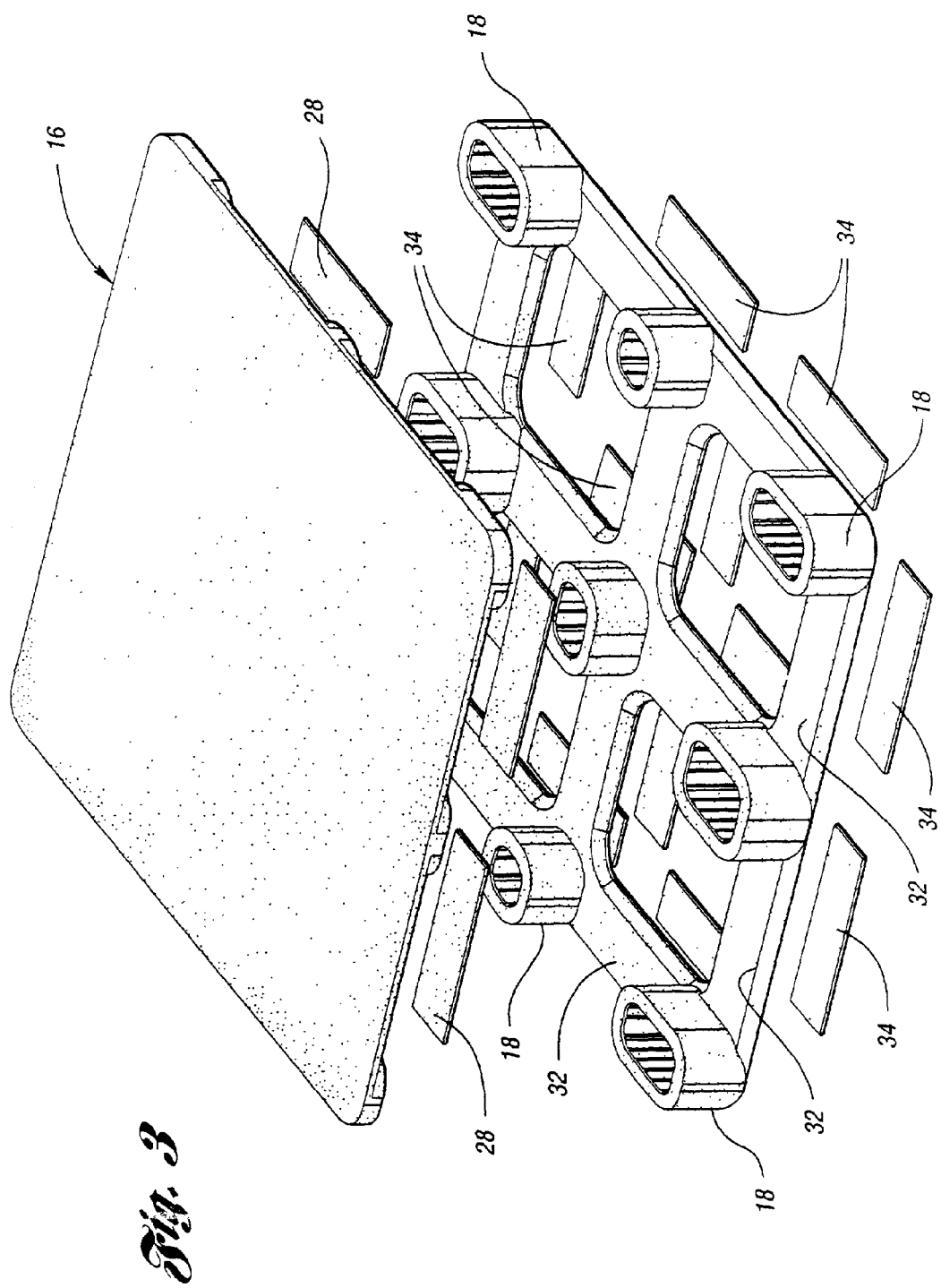
FIG. 3 shows a top exploded perspective view of the pallet of FIG. 1.

The pallet shown in FIG. 4 differs from the earlier embodiment described with reference to the FIGS. 1–3 in that a large sheet 50 is welded to the ribs 52 across the breadth of the upper deck 54 for improved structural integrity of the upper deck 54.

It is contemplated that good results could be achieved even by only welding the peripheral ribs to the plastic sheet strips. It is further contemplated that the plastic sheet strips need not be welded, but could be affixed in any manner, such as adhesive, etc. It is also contemplated that the sheet strips need not be plastic.

Figure 5:
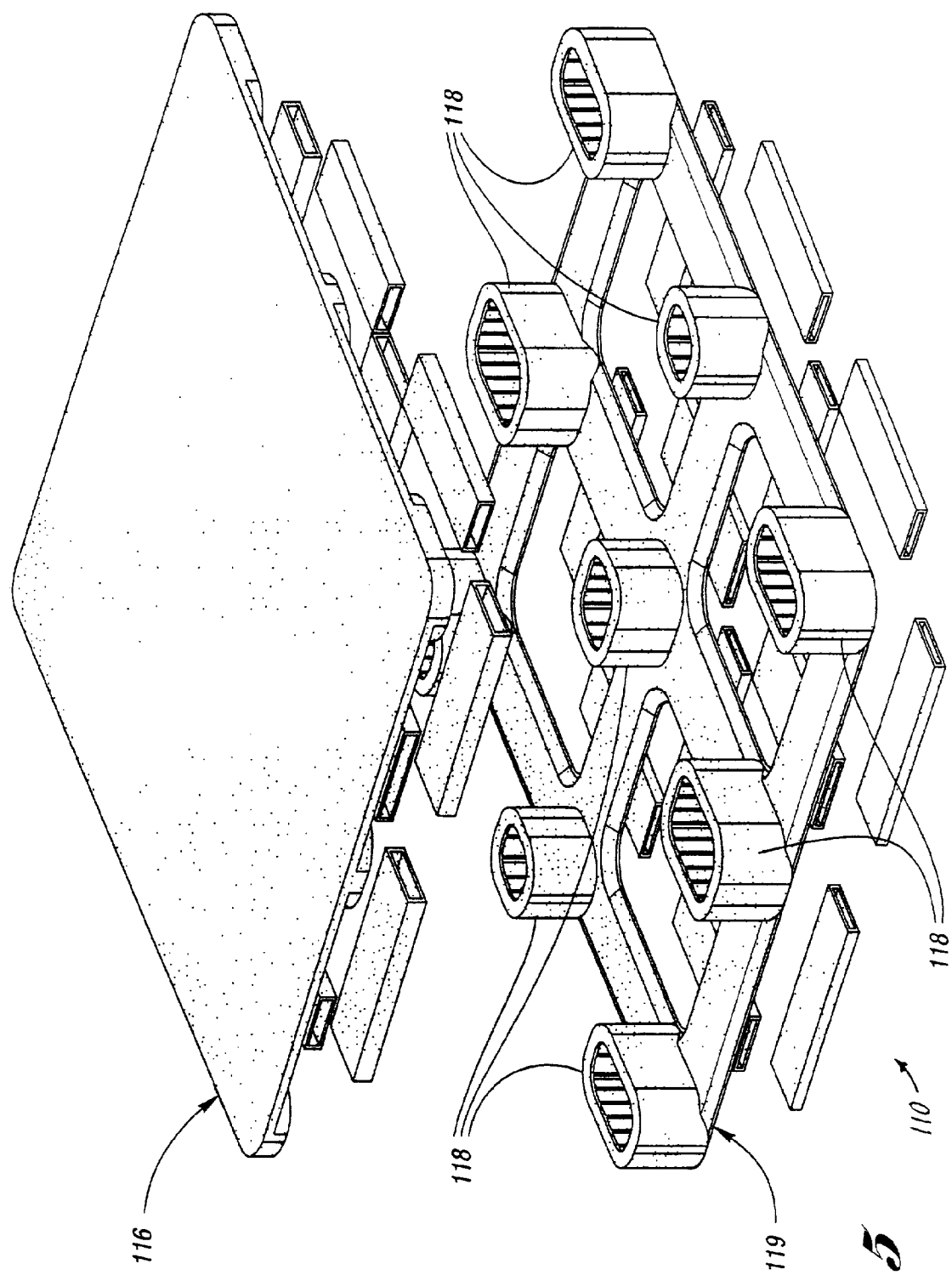
FIG. 5 shows a top exploded perspective view of a pallet in accordance with a second alternative embodiment of the invention.
Figure 6:
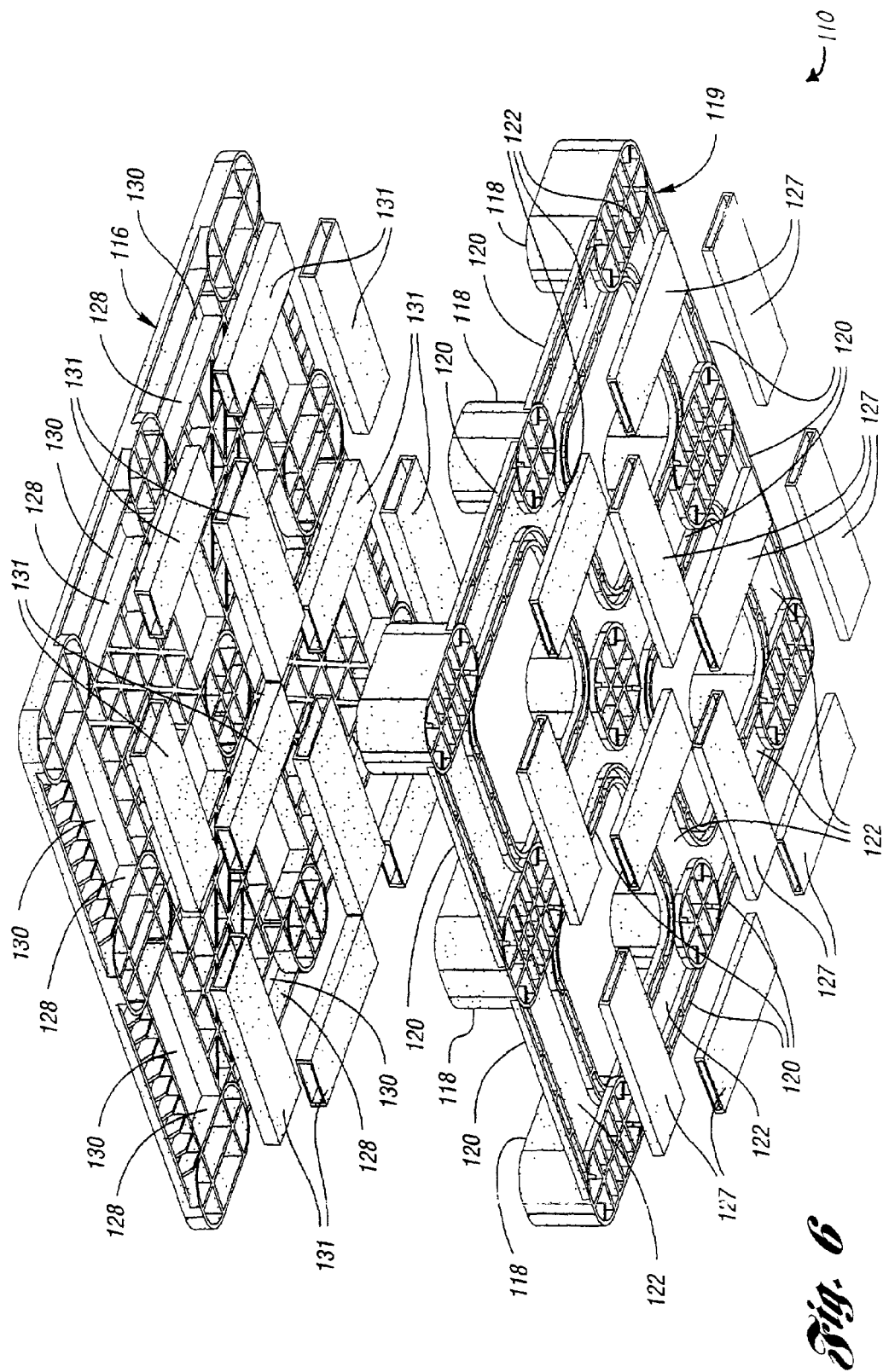
FIG. 6 shows a bottom exploded perspective view of the pallet of FIG. 5.

Referring to FIGS. 5 and 6, a second alternative embodiment of the invention is shown. In this embodiment, the pallet 110 includes a thin top deck 116 connected to a thin bottom deck 119 by nine support columns 118. The bottom deck 119 is comprised of a plurality of support rails 120 which extend between the columns 118. Each support rail 120 includes a sheet portion 122. Because each support rail 120 forms a relatively weak structural portion of the pallet 110, an extruded plastic rectangular tube 127 is welded against each respective sheet portion 122 to add stiffness to each support rail by forming substantially rectangular vertical cross-sections along the length of each support rail 120. Similarly, the top deck 116 includes open channels 128 adjacent the top sheet 130, and an extruded plastic rectangular tube 131 is welded within each channel 128 against the top sheet 130 between the columns 118 to form substantially rectangular vertical cross-sections along the length of each channel 128 between the columns 118 for improved stiffness. In this configuration, the rectangular tubes 127,131 may be inexpensively extruded, and add substantial structural integrity to the pallet 110 without limiting the pallet's ability to receive pallet jacks from any side thereof.

While the best mode for carrying out the invention has been described in detail, those familiar with the art to which this invention relates will recognize various alternative designs and embodiments for practicing the invention within the scope of the appended claims.

What is claimed is:

1. A pallet assembly comprising:
   a top deck pallet portion and a bottom deck pallet portion mounted to each other and having a plurality of column portions extending therebetween, wherein at least one of the top deck pallet portion and bottom deck pallet portion has a sheet portion; and
   at least one stiffening member securely mounted to the sheet portion, the at least one stiffening member includes an upper surface and an lower surface, one of the upper surface and the lower surface securely mounted to the sheet portion, at least one surface other than the one of the upper surface and the lower surface of the at least one stiffening member is exposed and not covered or contacted by the at least one of the top deck pallet portion and the bottom deck pallet portion.

2. A pallet assembly according to claim 1 wherein the at least one stiffening member includes at least one tube.

3. A pallet assembly according to claim 2 wherein the at least one stiffening member is a rectangular tube.

4. A pallet assembly according to claim 3 wherein the at least one stiffening member is a plastic rectangular tube.

5. A pallet assembly according to claim 4 wherein the at least stiffening member is an extruded plastic rectangular tube.

6. The pallet assembly according to claim 2 wherein the at least one tube includes an upper wall and a lower wall, one of the upper wall and the lower wall attached directly to the sheet portion.

7. A pallet assembly according to claim 1 wherein the at least one of the top deck pallet portion and bottom deck pallet portion further includes a plurality of ribs extending from the sheet portion, the at least one stiffening member securely mounted to the sheet portion adjacent the plurality of ribs.

8. A pallet assembly according to claim 7 wherein the at least one stiffening member is securely mounted to the sheet portion between the plurality of ribs.

9. A pallet assembly according to claim 8 wherein the at least one stiffening member includes a plurality of stiffening members.

10. A pallet assembly according to claim 9 wherein each of the plurality of stiffening members extends between an adjacent pair of column portions.

11. A pallet assembly according to claim 10 further including a plurality of cross-ribs extending from the sheet portion, each of the plurality of stiffening members disposed between cross-ribs.

12. The pallet assembly according to claim 1 wherein the at least one stiffening member is welded to the sheet portion.

13. The pallet assembly according to claim 1 wherein the other of the upper surface and the lower surface of the at least one stiffening member is exposed and is not contacted or covered by the at least one of the top deck pallet portion and the bottom deck pallet portion.

14. A pallet assembly comprising:
    a top deck pallet portion and a bottom deck pallet portion mounted to each other and having a plurality of column portions extending therebetween, wherein the bottom deck pallet portion has a sheet portion; and
    at least one stiffening member securely mounted to the sheet portion, wherein the at least one stiffening member includes an upper surface and an lower surface, wherein the upper surface of the at least one stiffening member is securely mounted to the sheet portion of the bottom deck pallet portion and wherein the lower surface of the at least one stiffening member is not contacted by the bottom deck pallet portion and is exposed for contacting a floor upon which the pallet assembly rests.

15. The pallet assembly according to claim 1 wherein the at least one stiffening member is welded to the sheet portion.

16. A pallet assembly comprising:
    a top deck pallet portion having a top sheet portion and a plurality of ribs extending therefrom;
    a bottom deck pallet portion having a bottom sheet portion and a plurality of ribs extending therefrom;
    a plurality of column portions extending between the top deck pallet portion and the bottom deck pallet portion; and
    a plurality of elongated stiffening members mounted directly to the top sheet portion and the bottom sheet portion, each of the plurality of stiffening members extending between an adjacent pair of the plurality of column portions but not extending into a periphery of the each of the adjacent pair of column portions.

17. A pallet assembly of claim 16 wherein each of the plurality of stiffening members is an extruded plastic rectangular tube.

18. A pallet assembly of claim 17 wherein each of the plurality of stiffening members is mounted between the plurality of ribs.

19. A pallet assembly of claim 18 wherein the top deck pallet portion is integrally injection-molded as a unitary construction, separately from the plurality of stiffening members.

20. The pallet assembly according to claim 16 wherein each of the plurality of stiffening members includes an upper surface and an lower surface, one of the upper surface and the lower surface of each of the plurality of stiffening members mounted directly to the top sheet portion or the bottom sheet portion.

21. The pallet assembly according to claim 20 wherein the other of the upper and lower surfaces of each of the plurality of stiffening members is at least substantially exposed.

22. A pallet assembly comprising:
    a first pallet deck having a first sheet portion and a plurality of ribs extending therefrom;
    a second pallet deck;
    a plurality of column portions extending between the first pallet deck and the second pallet deck; and a plurality of tubular stiffening members mounted directly to the first sheet portion of the first pallet deck, each of the plurality of stiffening members extending between an adjacent pair of the plurality of column portions, each of the plurality of stiffening members includes an upper surface and an lower surface, one of the upper surface and the lower surface of each of the plurality of stiffening members mounted directly to the first sheet portion, wherein the other of the upper and lower surfaces of each of the plurality of stiffening members is at least substantially exposed and not contacted by the first pallet deck.

23. A pallet assembly according to claim 22 wherein the ribs comprise a plurality of cross-ribs.

24. A pallet assembly according to claim 22 wherein the ribs extend continuously across the column portions.

25. The pallet assembly according to claim 22 wherein the plurality of stiffening members do not extend into a periphery defined by each of the plurality of column portions.

26. The pallet assembly according to claim 22 wherein the plurality of stiffening members are elongated and wherein the entirety of each stiffening member is between mutually-facing outer surfaces of an adjacent pair of the plurality of column portions.

27. The pallet assembly according to claim 26 wherein axial ends of the stiffening members abut the outer surfaces of the adjacent pair of the plurality of column portions.

* * * * *